United States Patent
Ihm et al.

(10) Patent No.: US 8,898,030 B2
(45) Date of Patent: Nov. 25, 2014

(54) METHOD FOR ADAPTIVELY COMPENSATING POSITION ERROR OF RESOLVER

(75) Inventors: Hyungbin Ihm, Seoul (KR); Taeyoung Chung, Seoul (KR); Byunghoon Yang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 498 days.

(21) Appl. No.: 13/274,701

(22) Filed: Oct. 17, 2011

(65) Prior Publication Data

US 2012/0143549 A1    Jun. 7, 2012

(30) Foreign Application Priority Data

Dec. 1, 2010   (KR) .................. 10-2010-0121476

(51) Int. Cl.
  *G01B 21/00*  (2006.01)
  *G01D 5/244*  (2006.01)
  *G01B 21/22*  (2006.01)
(52) U.S. Cl.
  CPC ............ *G01B 21/22* (2013.01); *G01D 5/24476* (2013.01); *G01B 21/00* (2013.01)
  USPC .......................................................... 702/94
(58) Field of Classification Search
  CPC ...................................................... G01B 21/00
  USPC .......................................................... 702/94
  See application file for complete search history.

(56) References Cited

U.S. PATENT DOCUMENTS

| | | | | |
|---|---|---|---|---|
| 7,362,070 B2* | 4/2008 | Games et al. | ................. | 318/605 |
| 2008/0120055 A1 | 5/2008 | Cheng | | |
| 2008/0309267 A1 | 12/2008 | Cheng | | |
| 2010/0000815 A1* | 1/2010 | Tang et al. | ............... | 180/65.285 |
| 2010/0004895 A1 | 1/2010 | Wells et al. | | |

FOREIGN PATENT DOCUMENTS

| | | |
|---|---|---|
| JP | 2000262081 A | 9/2000 |
| JP | 2001128484 A | 5/2001 |
| JP | 2001165707 A | 6/2001 |
| JP | 2006-349561 A | 12/2006 |
| KR | 10-0155746 | 7/1998 |
| KR | 10-0168068 | 10/1998 |
| KR | 10-0176469 | 11/1998 |
| KR | 10-0785583 B1 | 12/2007 |
| KR | 10-2010-0118307 A | 11/2010 |

* cited by examiner

*Primary Examiner* — Bryan Bui
(74) *Attorney, Agent, or Firm* — Edwards Wildman Palmer LLP; Peter F. Corless (57) ABSTRACT

Disclosed are an apparatus and method for adaptively compensating a position error of a resolver. The apparatus adaptively estimating a position error contained in position information of a rotor of a motor, which is digitalized by a resolver-digital converter, and subtracting the estimated position error from the measured position information of the rotor, thereby calculating compensated position information. A regression equation and a recursive least square method applied to the regression equation are used for the adaptive estimation of the position information.

10 Claims, 9 Drawing Sheets

| VEHICLE SAMPLE | PARAMETER(UNIT: rad) | | | |
| --- | --- | --- | --- | --- |
| | $\psi 1$ | $\psi 2$ | $\psi 3$ | $\psi 4$ |
| #1 | −0.0250 | −0.0073 | 0.0014 | −0.0072 |
| #2 | −0.0247 | 0.0012 | −0.0051 | −0.0019 |
| #3 | −0.0294 | −0.0081 | −0.0054 | −0.0059 |

FIG.6D

METHOD FOR ADAPTIVELY COMPENSATING POSITION ERROR OF RESOLVER

CROSS-REFERENCE TO RELATED APPLICATIONS

The present application claims priority to Korean Patent Application Number 10-2010-0121476 filed Dec. 1, 2010, the entire contents of which application is incorporated herein for all purposes by this reference.

BACKGROUND OF THE INVENTION

1. Field of the Invention

The present invention relates to a method for compensating a position error contained in position information measured from a resolver which is a position sensor used for motor control.

2. Description of Related Art

When a permanent magnet synchronous motor is driven by vector control, accurate position information of a rotor thereof is required. Typically, a resolver (e.g., a pressure sensor) may be used to recognize the absolute position of the rotor. However, due to a difference in the transformation ratios of the resolver, unbalanced excitation signals, existence of inductance harmonic components, and distortion on a signal processing circuit, a magnitude unbalance of signals occurs, thereby causing a periodic error component in the position information. Accordingly, since the motor control performance is degraded, resolvers are limited as to their use and effectiveness in the high-performance field.

In order to reduce such a position error in the resolver, error information which is previously measured by a precise position sensor may be written into a table of a memory, for example, a ROM (Read Only Memory), and a position error may then be compensated based on the error information (hereinafter "the first related art").

Alternatively, output signals of the resolver may be modeled by using a regression equation, and a recursive least square method may be then used to estimate a model parameter such that an error between model values and the measured signals are minimized, thereby compensating for the output signals of the resolver (hereinafter "the second related art").

In the first related art, a measurement operation is required to acquire error data which is stored in a table in the memory, and such error data acquired for one sample product does not reflect a deviation between products. Therefore, according to the first related art, an individual zero adjustment needs to be performed for each product thus, required additional computations which slow efficiency and the overall speed of the process.

In the second related art, output signals of the resolver are directly compensated by an estimated signal model. However, since the signals are high-frequency AC values and a complicated analog electronic circuit or a digital signal processing system is required for the compensation process, it is not easy to implement this solution. Furthermore, accurate compensation may be achieved only when the measured position information is synchronized with the calculated error information. Therefore, an individual zero adjustment needs to be performed for each product, similar to the first related art, thus again requiring additional computations which slow efficiency and the overall speed of the process.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to provide an apparatus for adaptively compensating a position error of a resolver, by using an output signal of a resolver-digital converter which does not require the use of an output signal of the resolver.

An exemplary embodiment of the present invention provides an apparatus for adaptively compensating a position error of a resolver, the apparatus including a position error estimator which is configured to receive position information related to a rotor of a motor, which is detected by the resolver, from a resolver-digital converter. In particular, the resolver-digital converter is configured to digitize the position information and adaptively estimate a position error included in the position information. Additionally, a position error compensator subtracts the estimated position error from the position information, and calculates compensated position information.

The position error estimator may include a speed ripple estimation section which is configured to acquire a speed ripple by subtracting an ideal speed from a value obtained by differentiating the position information. This ideal speed may be obtained by removing a frequency component of a ripple caused by the position error from the value obtained by differentiating the position information. The position error estimator also includes a parameter estimation section which is configured to apply a recursive least square method to a regression equation including the speed ripple, the position information, and the ideal speed, and estimates unknown parameters contained in the regression equation. Furthermore, a position error modeling section creates a position error model equation by using the estimated unknown parameters and the position information, and estimates the position error from the position error model equation.

The regression equation may be expressed by the following expression:

$$\omega_{ripple}(i) = \omega \cos\theta_i \cdot \psi_1^0 - \omega \sin\theta_i \cdot \psi_2^0 + 2\omega \cos 2\theta_i \cdot \psi_3^0 - 2\omega \sin 2\theta_i \cdot \psi_4^0,$$

where $\omega_{ripple}(i)$ represents a speed ripple for i-th position information $\theta_i$, $\omega$ represents the ideal speed, and $\psi_1^0$, $\psi_2^0$, $\psi_3^0$, and $\psi_4^0$ represent the known parameters.

The position error model equation may be expressed by the following expression:

$$\theta_{Ep}(i) = \sin\theta_i \cdot \psi_{1p}^0 + \cos\theta_i \cdot \psi_{2p}^0 + \sin 2\theta_i \cdot \psi_{3p}^0 + \cos 2\theta_i \cdot \psi_{4p}^0,$$

where $\theta_{Ep}(i)$ represents an estimated position error for i-th position information.

Another exemplary embodiment of the present invention provides a system including the apparatus, a resolver, and a resolver-digital converter.

Yet another exemplary embodiment of the present invention provides a method executed by the apparatus and a computer-readable recording medium in which a computer program for executing the method is recorded.

Advantageously, it is possible to easily implement the position error compensation of the resolver, thereby automatically adapting a deviation between products. Accordingly, the degradation of motor control performance caused by a position error may be prevented, and the maximum control performance may be exhibited. For example, the pulsation of current and torque may be minimized, a speed measurement ripple may be reduced to enhance a control function using speed information, and a current ripple may be minimized to increase the available effective voltage, thereby securing a maximum output region.

Further, since the exemplary embodiment of the present invention may be implemented in a software manner which is executed by a processor, controller or the like without depending on an external separate physical unit, it is possible to simply compensate the position error of the resolver at a lower cost. Furthermore, since an expensive high-precision position sensor does not need to be used to secure the performance of the resolver, it is possible to implement a high-performance resolver system at an even lower cost.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles having an electric motor in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example, both gasoline-powered and electric-powered vehicles.

Figure 1:
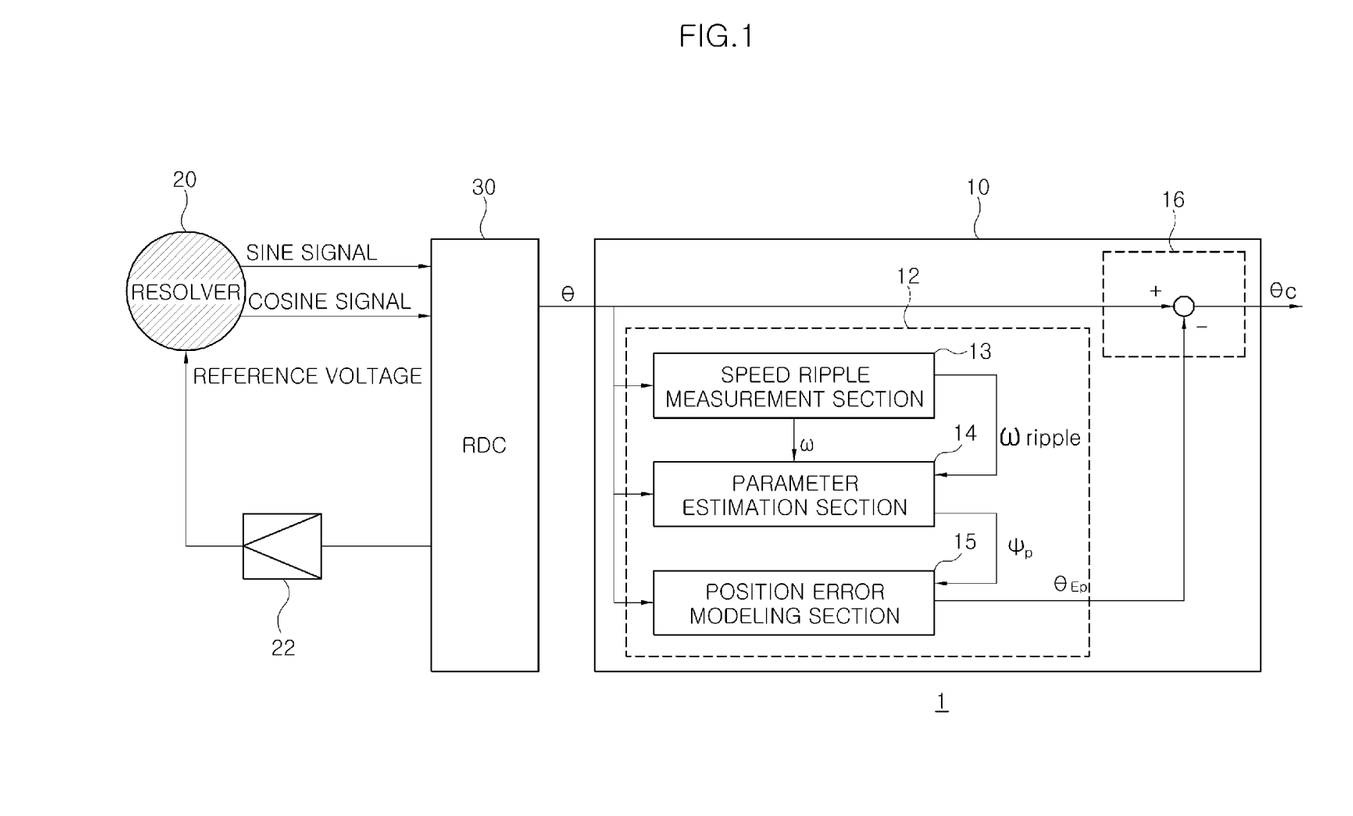
FIG. 1 is a configuration diagram of an apparatus according to an exemplary embodiment of the present invention.

FIG. 1 illustrates an apparatus 10 according to an exemplary embodiment of the present invention. Apparatus 10 for adaptively compensating a position error of a resolver includes a position error estimator 12 and a position error compensator 16. Position error estimator 12 includes a speed ripple measurement section 13, a parameter estimation section 14, and a position error modeling section 15. A system 1 for adaptively compensating a position error of a resolver further includes a resolver 20 and a resolver-digital converter 30.

The resolver 20 detects the absolute position of a rotor of a motor such as a permanent magnet synchronous motor. For this operation, the resolver 20 is operated by an excitation reference voltage amplified by an excitation amplifier 22. The position information detected by resolver 20 is outputted as a sine signal and a cosine signal to the resolver-digital converter 30.

The resolver-digital converter 30 digitalizes and outputs the position information. The digitalized position information θ is inputted to the speed ripple measurement section 13, the parameter estimation section 14, the position error modeling section 15, and the position error compensation section 16, respectively. The position error compensation section 16 subtracts a position error $θ_{Ep}$ estimated by the position error modeling section 15 from the measured position error θ, and calculates the compensated position information $θ_c$.

Figure 2:
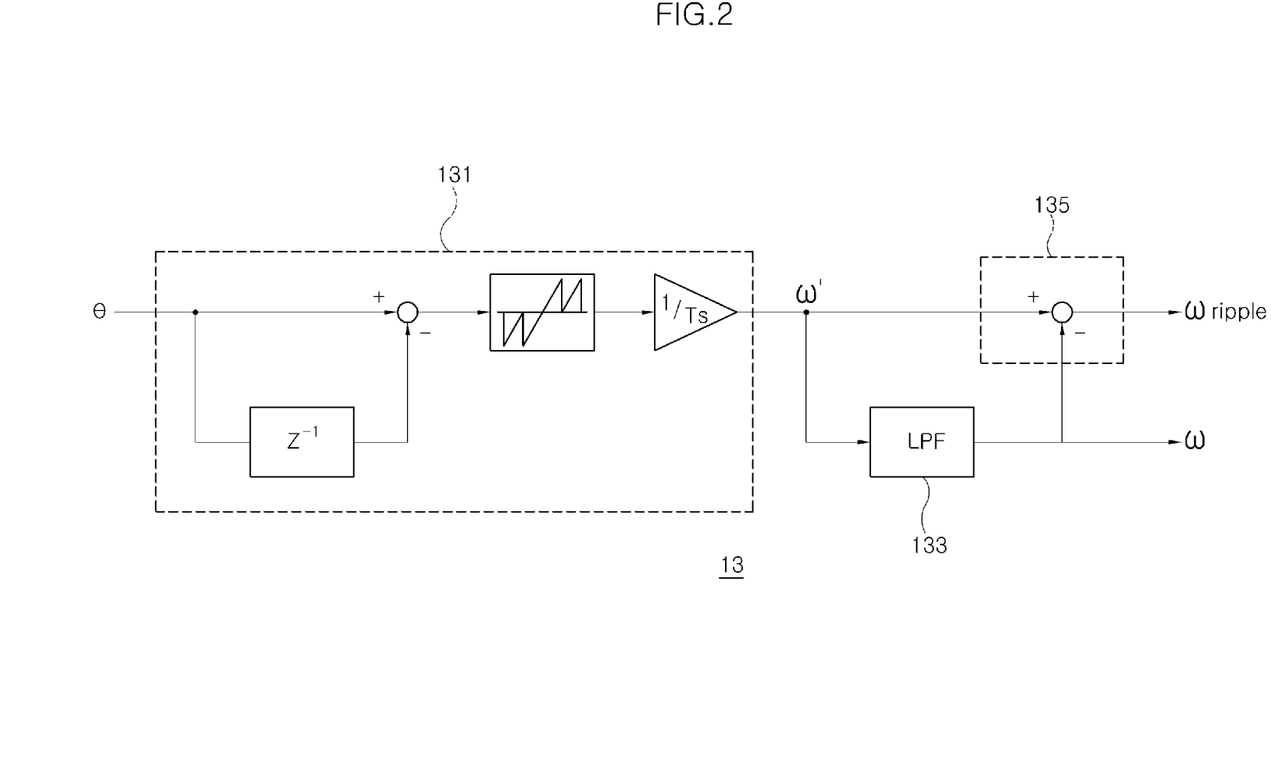
FIG. 2 is a detailed configuration diagram of a speed ripple measurement section of FIG. 1.

FIG. 2 illustrates the detailed configuration of the speed ripple measurement section 13 of FIG. 1. The speed ripple measurement section 13 includes a position information differentiation unit 131, an ideal speed calculation unit 133, and a speed ripple calculation unit 135. The position information differentiation unit 131 differentiates the position information θ and acquires speed information ω'. The ideal speed calculation unit 133 includes a low-pass filter (LPF) to calculate an ideal speed ω. The speed ripple calculation unit 135 subtracts the ideal speed ω from the speed information ω' and calculates and outputs a speed ripple.

The position information differentiation unit 131 subtracts the previous position information $Z^{-1}$ from the position information θ received from the resolver-digital converter 30 and acquires a position increment x. Then, the position information differentiation unit 131 performs a modulo operation on the position increment x (mod(x, 2π)), and acquires compensated position information. Furthermore, the position information differentiation unit 131 divides the compensated position information by a sampling period Ts and acquires the speed information ω'. Here, $Z^{-1}$ represents one sample of an earlier time in a discrete time system referred to as a z-domain. Therefore, two samples of an earlier time may be represented by $Z^{-2}$. Meanwhile, since the position information outputted from the resolver-digital converter 30 has a limited range of 0 to 2π, an error may occur in the difference value, around a discontinuity point of 0 or 2π. However, as the module operation is performed on the position increment x as described above, such an error may be compensated.

The speed information ω' acquired in such a manner reflects an effect of the position error. Therefore, in order to measure a speed ripple $ω_{ripple}$, the ideal speed ω from which the effect of the position error is excluded needs to be adopted. The ideal speed ω is acquired by removing a frequency component of the ripple caused by the position error from the speed information obtained by differentiating the position information. The ideal speed calculation unit 133 calculates the ideal speed ω from which the frequency component of the ripple caused by the position error is removed, by using the LPF in which a cut-off frequency is set to remove a speed component by the position error. The speed ripple calculation unit 135 calculates the speed ripple by subtracting the ideal speed ω from the speed information ω', and outputs the calculated speed ripple.

Figure 3:
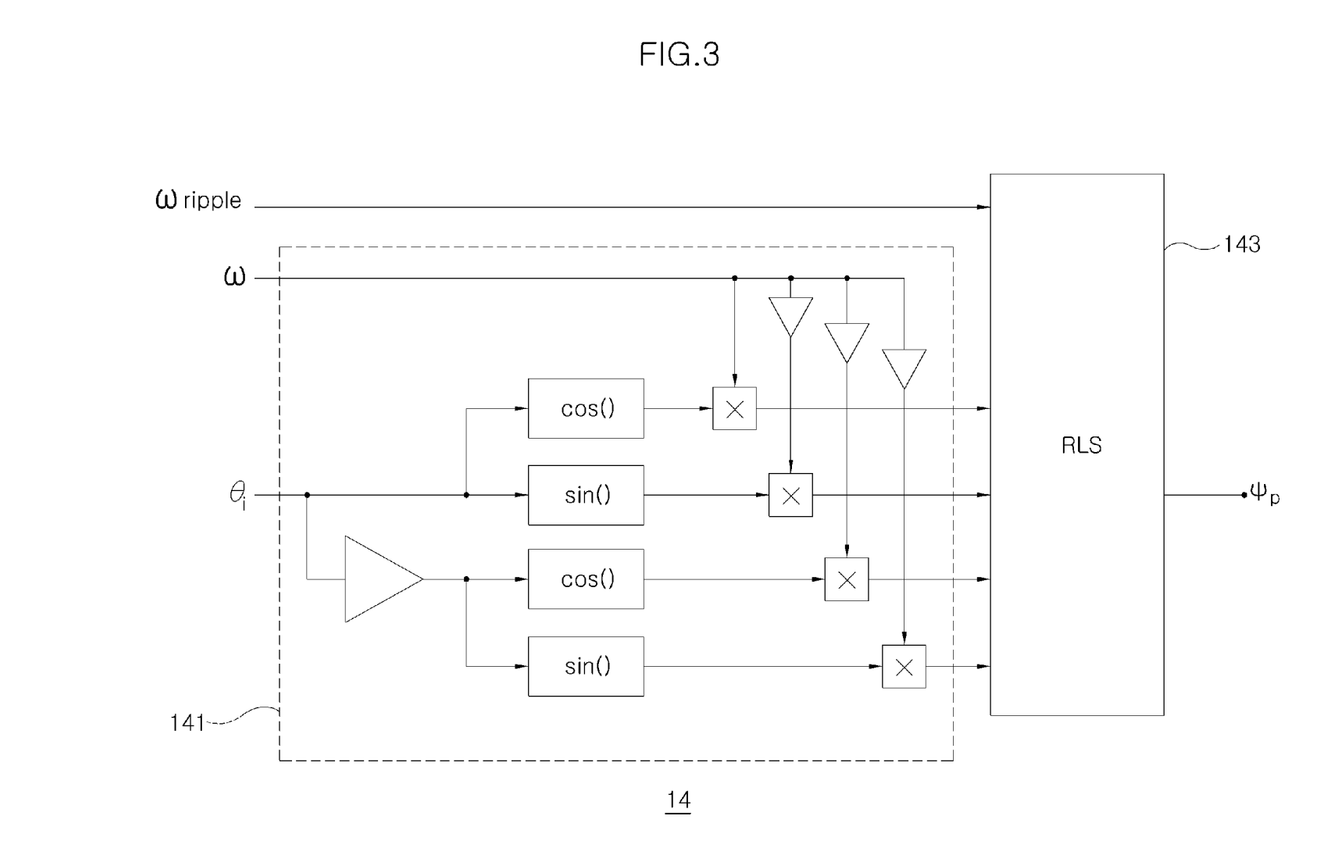
FIG. 3 is a detailed configuration diagram of a parameter estimation section of FIG. 1.

FIG. 3 illustrates the detailed configuration of the parameter estimation section 14 of FIG. 1. The parameter estimation section 14 includes a regression equation creation unit 141 and a parameter estimated-value calculation unit 143. The regression equation creation unit 141 creates a regression equation according to the following expressions, by using the ideal speed ω received from the speed ripple estimation section 13 and the position information θ received from resolver-digital converter 30.

$$\theta_E(i) = \psi_0 + \underset{n=1}{Q} (\sin n\theta \cdot \psi_n + \cos n\theta \cdot \psi_n) \quad \text{[Expression 1]}$$

$$\theta_E(i) = \sin\theta_i \cdot \psi_1^0 + \cos\theta_i \cdot \psi_2^0 + \sin 2\theta_i \cdot \psi_3^0 + \cos 2\theta_i \cdot \psi_4^0 + \psi_5^0 \quad \text{[Expression 2]}$$

$$\omega_{ripple}(i) = \omega\cos\theta_i \cdot \psi_1^0 - \omega\sin\theta_i \cdot \psi_2^0 + 2\omega\cos 2\theta_i \cdot \psi_3^0 - 2\omega\sin 2\theta_i \cdot \psi_4^0 = \psi^T(\theta)\psi^0 \quad \text{[Expression 3]}$$

In Expressions 1 to 3, ψ represents an unknown parameter, and i represents an i-th order. In Expressions 2 and 3, a super-script 0 of ψ indicates that the corresponding parameter is not a value based on a general expression such as Expression 1, but an actual value. In Expression 3, T represents a transpose matrix.

Expression 1 indicates that the position error $\theta_E(i)$ may be expressed as a Fourier series. Expression 2 is obtained by reflecting that the magnitudes of a fundamental wave and a secondary harmonic wave are superior in the position error, in most cases. That is, Expression 2 is obtained by approximating Expression 1 to the two frequency components. Expression 3 is obtained by differentiating Expression 2.

When Expression 3 is finally obtained in such a manner, the parameter estimated-value calculation unit 143 applies a recursive least square method to Expression 3, and calculates the estimated values ($\psi_{1p}^0$, $\psi_{2p}^0$, $\psi_{3p}^0$, and $\psi_{4p}^0$) for the unknown parameters ($\psi_1^0$, $\psi_2^0$, $\psi_3^0$, and $\psi_4^0$), respectively. The estimated values for the unknown parameters ($\psi_1^0$, $\psi_2^0$, $\psi_3^0$, and $\psi_4^0$) are a set of parameters which are decided by applying the recursive least square method such that the square of an error between the speed ripple $\omega_{ripple}$ by the measurement and the speed ripple $\omega_{ripple}$ by the estimation is minimized.

Figure 4:
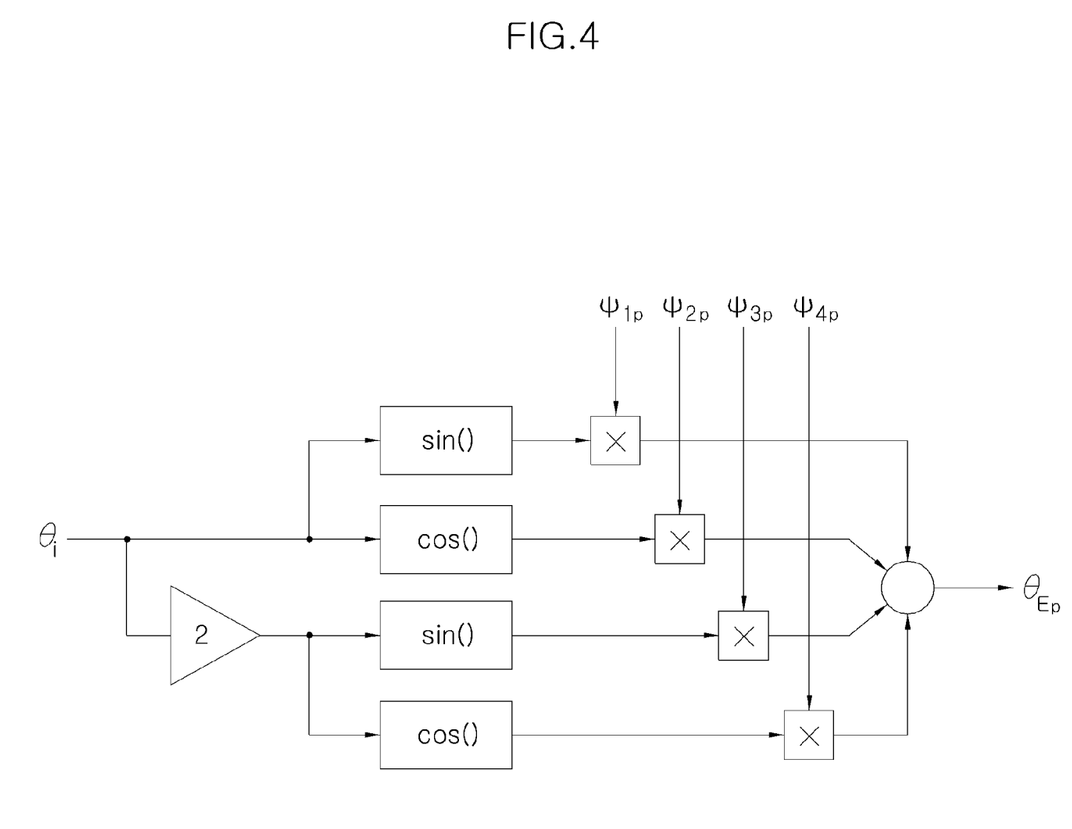
FIG. 4 is a detailed configuration diagram of a position error modeling section of FIG. 1.

FIG. 4 illustrates the detailed configuration of the position error modeling section 15 of FIG. 1. The position error modeling section 15 applies the set of unknown parameters ($\psi_{1p}^0$, $\psi_{2p}^0$, $\psi_{3p}^0$, and $\psi_{4p}^0$) estimated by the parameter estimation section 14 and the position information θ to Expression 4, and calculates an estimated value $\theta_{Ep}$ of the position error.

$$\theta_{Ep}(i) = \sin\theta_i \cdot \psi_{1p}^0 + \cos\theta_i \cdot \psi_{2p}^0 + \sin 2\theta_i \cdot \psi_{3p}^0 + \cos 2\theta_i \cdot \psi_{4p}^0 \quad \text{[Expression 4]}$$

The position error compensation section 16 subtracts the position error $\theta_{Ep}$ estimated by the position error modeling section 15 from the measured position error θ, and calculates compensated position information $\theta_c$.

Figure 5:
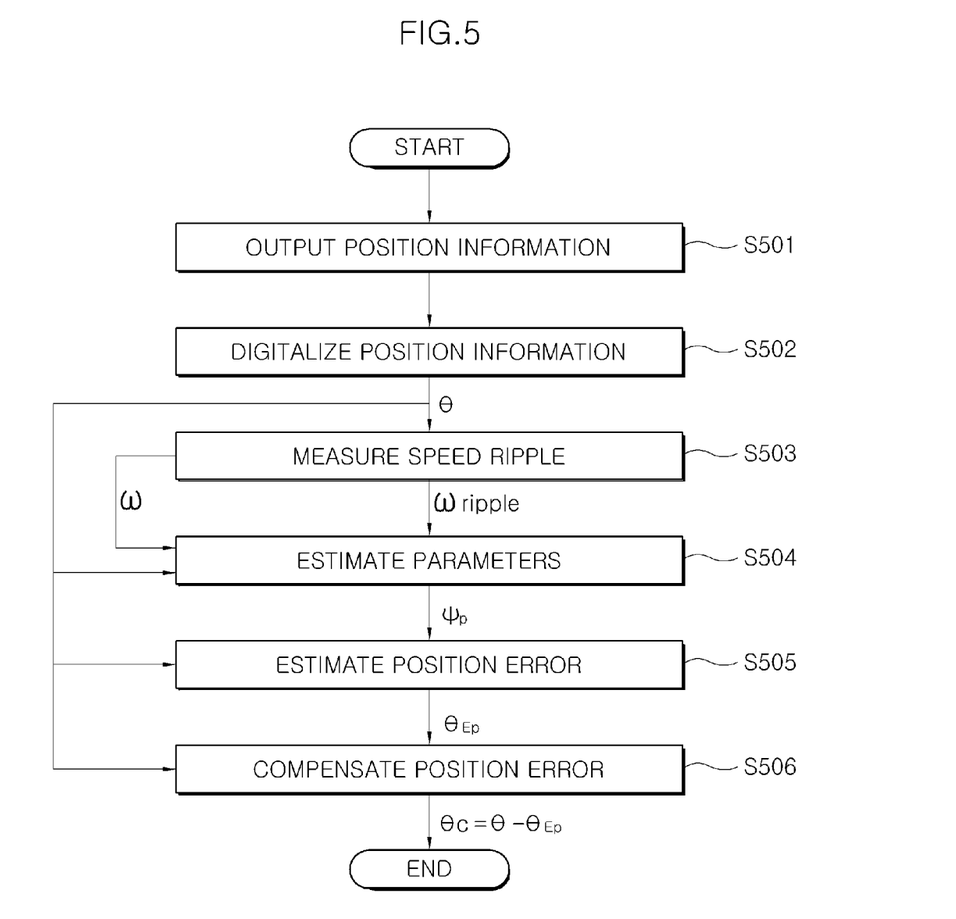
FIG. 5 is a flow chart showing a method according to an exemplary embodiment of the present invention.

FIG. 5 is a flow chart explaining the operation of the apparatus according to the exemplary embodiment of the present invention. When the position information of a rotor of a motor, detected by the resolver 20, is outputted (S501), the resolver-digital converter 30 digitalizes the position information (S502). The digitalized position information θ is supplied to the speed ripple measurement section 13, the parameter estimation section 14, the position error modeling section 15, and the position error compensation section 16, respectively.

At step S503, the speed ripple measurement section 13 measures a speed ripple $\omega_{ripple}$ according to the above-described method. At step S504, the parameter estimation section 14 estimates unknown parameters included in the regression equation by using the position information θ, the ideal speed ω, and the speed ripple $\omega_{ripple}$, according to the above-described method. At step S505, the position error modeling section 15 estimates a position error by using the estimated unknown parameters $\psi_p$ and the position information θ, according to the above-described method. At step S506, the position error compensation section 16 acquires compensated position information $\theta_c$ by subtracting the estimated position error $\theta_{Ep}$ from the position information θ, according to the above-described method.

The exemplary embodiment of the present invention includes the method according to the flow chart of FIG. 5 and a computer readable recording medium in which a computer program for executing the method is recorded. That is, the present invention may be embodied as computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems or telematics servers so that the computer readable media is stored and executed in a distributed fashion.

FIGS. 6A to 6D are graphs showing an experiment result obtained by applying the method according to the exemplary embodiment of the present invention to an actual motor system. The motor system used in the experiment is a motor system which has been applied to HYUNDAI SONATA HYBRID (project name: YF) and KIA OPTIMA HYBRID (project name: TF) which will be launched on the market of North America.

Figure 6A:
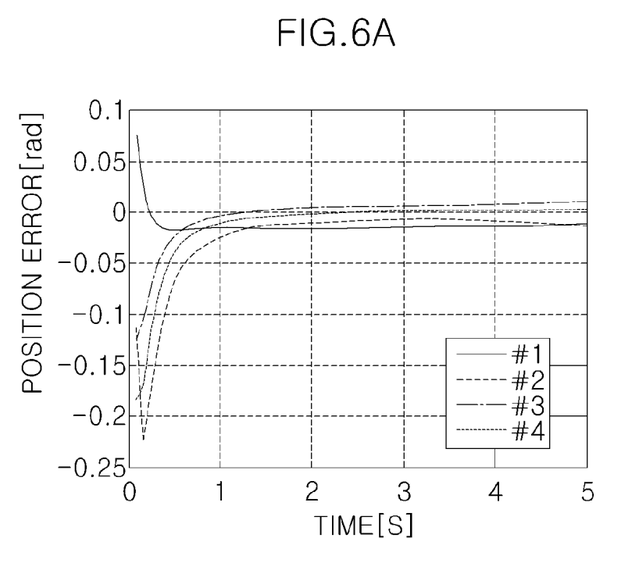
FIGS. 6A to 6D are graphs showing experiment results according to the exemplary embodiment of the present invention.

FIG. 6A shows that the unknown parameters converge to a constant position error as the time elapses.

Figure 6B:
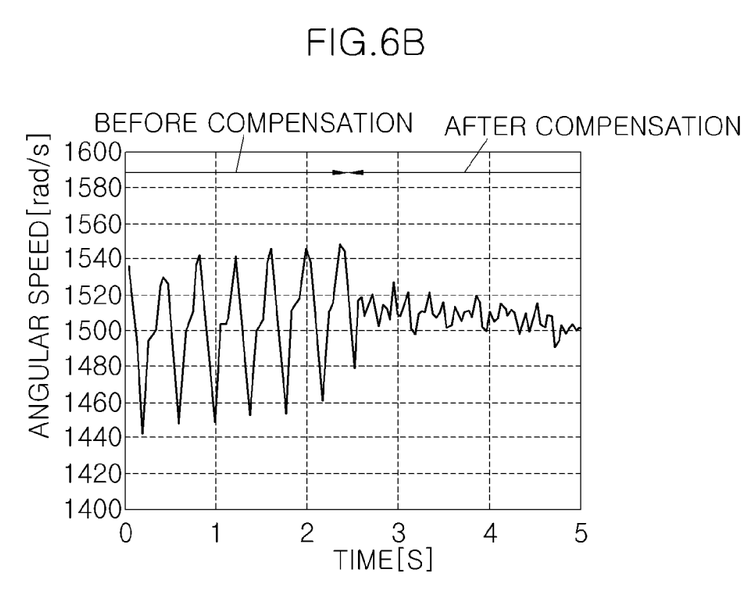

FIG. 6B shows that changes in the speed ripple before and after the compensation of the position error in accordance with the time. According to the exemplary embodiment of the present invention, it can be seen that the variation in the speed ripple after the compensation of the position error is significantly reduced in comparison with the variation in the speed ripple before the compensation of the position error.

Figure 6C:
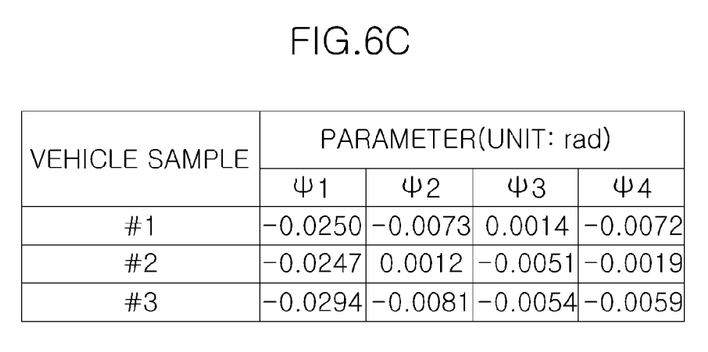

FIG. 6C shows the values of parameters estimated from three vehicle samples. As the experiment results, it can be seen that 80% of the measured speed ripple was reduced (100 rpm→24 rpm), and the parameters were estimated adaptively for the distribution between the vehicle samples.

Figure 6D:
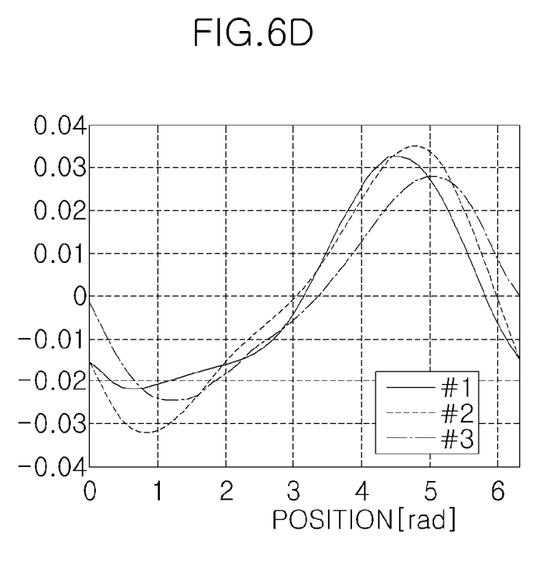

FIG. 6D shows the position error comparison between the vehicle samples. It can be seen that there is no deviation of the position error between the vehicle samples depending on the position of the rotor of the motor.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for adaptively compensating a position error of a resolver, the apparatus comprising:
a position error estimator configured to receive position information of a rotor of a motor, which is detected by the resolver, from a resolver-digital converter wherein the resolver-digital converter is configured to digitalize the position information and adaptively estimate a position error included in the position information,
wherein the position error estimator comprises:
a speed ripple estimation section configured to acquire a speed ripple by subtracting an ideal speed from a value obtained by differentiating the position information, wherein the ideal speed is obtained by removing a frequency component of a ripple caused by the position error from the value obtained by differentiating the position information;
a parameter estimation section configured to apply a recursive least square method to a regression equation including the speed ripple, the position information, and the ideal speed, and estimate unknown parameters contained in the regression equation; and
a position error modeling section configured to create a position error model equation by using the estimated unknown parameters and the position information, and estimate the position error from the position error model equation; and
a position error compensator configured to subtract the estimated position error from the position information, and calculate compensated position information.

2. The apparatus as defined in claim 1, wherein the regression equation is expressed by the following expression:

$$\omega_{ripple}(i)=\omega \cos \theta_i \cdot \psi_1{}^0 - \omega \sin \theta_i \cdot \psi_2{}^0 + 2\omega \cos 2\theta_i \cdot \psi_3{}^0 - 2\omega \sin 2\theta_i \cdot \psi_4{}^0,$$

where $\omega_{ripple}(i)$ represents a speed ripple for i-th position information $\theta_i$, $\omega$ represents the ideal speed, and $\psi_1{}^0$, $\psi_2{}^0$, $\psi_3{}^0$, and $\psi_4{}^0$ represent the known parameters.

3. The apparatus as defined in claim 2, wherein the position error model equation is expressed by the following expression:

$$\theta_{Ep}(i)=\sin \theta_i \cdot \psi_{1p}{}^0 + \cos \theta_i \cdot \psi_{2p}{}^0 + \sin 2\theta_i \cdot \psi_{3p}{}^0 + \cos 2\theta_i \cdot \psi_{4p}{}^0,$$

where $\theta_{Ep}(i)$ represents an estimated position error for i-th position information.

4. A system comprising:
a resolver configured to detect position information of a rotor of a motor;
a resolver-digital converter configured to receive the position information detected by the resolver and digitalize the position information;
a position error estimator configured to receive position information from a resolver-digital converter and adaptively estimate a position error included in the position information,
wherein the position error estimator comprises:
a speed ripple estimation section configured to acquire a speed ripple by subtracting an ideal speed from a value obtained by differentiating the position information, wherein the ideal speed is obtained by removing a frequency component of a ripple caused by the position error from the value obtained by differentiating the position information;
a parameter estimation section configured to apply a recursive least square method to a regression equation including the speed ripple, the position information, and the ideal speed, and estimate unknown parameters contained in the regression equation; and
a position error modeling section configured to create a position error model equation by using the estimated unknown parameters and the position information, and estimate the position error from the position error model equation; and
a position error compensator configured to subtract the estimated position error from the position information, and calculate compensated position information.

5. A non-transitory computer readable medium containing executable program instructions executed by a controller, comprising:
program instructions that receive position information of a rotor of a motor, which is detected by the resolver, from a resolver-digital converter which digitalizes the position information;
program instructions that measure a speed ripple by subtracting an ideal speed from a value obtained by differentiating the received position information, wherein the ideal speed is obtained by removing a frequency component of a ripple caused by the position error from the value obtained by differentiating the position information;
program instructions that estimate unknown parameters contained in a regression equation by applying a recursive least square method to the regression equation including the speed ripple, the position information, and the ideal speed;
program instructions that create a position error model equation by using the estimated unknown parameters and the position information, and estimating the position error from the position error model equation; and
program instructions that calculate compensated position information by subtracting the estimated position error from the position information.

6. The non-transitory computer-readable medium as defined in claim 4, wherein the regression equation is expressed by the following expression:

$$\omega_{ripple}(i)=\omega \cos \theta_i \cdot \psi_1{}^0 - \omega \sin \theta_i \cdot \psi_2{}^0 + 2\omega \cos 2\theta_i \cdot \psi_3{}^0 - 2\omega \sin 2\theta_i \cdot \psi_4{}^0,$$

where $\omega_{ripple}(i)$ represents a speed ripple for i-th position information $\theta_i$, $\omega$ represents the ideal speed, and $\psi_1{}^0$, $\psi_2{}^0$, $\psi_3{}^0$, and $\psi_4{}^0$ represent the known parameters.

7. The non-transitory computer-readable medium as defined in claim 6, wherein the position error model equation is expressed by the following expression:

$$\theta_{Ep}(i)=\sin \theta_i \cdot \psi_{1p}{}^0 + \cos \theta_i \cdot \psi_{2p}{}^0 + \sin 2\theta_i \cdot \psi_{3p}{}^0 + \cos 2\theta_i \cdot \psi_{4p}{}^0,$$

where $\theta_{Ep}(i)$ represents an estimated position error for i-th position information.

8. A method comprising:
receiving, by a controller, position information of a rotor of a motor, which is detected by a resolver, from a resolver-digital converter which digitalizes the position information;

measuring, by the controller, a speed ripple by subtracting an ideal speed from a value obtained by differentiating the received position information, wherein the ideal speed is obtained by removing a frequency component of a ripple caused by the position error from the value obtained by differentiating the position information;

estimating, by the controller, unknown parameters contained in a regression equation by applying a recursive least square method to the regression equation including the speed ripple, the position information, and the ideal speed;

creating, by the controller, a position error model equation by using the estimated unknown parameters and the position information, and estimating the position error from the position error model equation; and calculating, by the controller, compensated position information by subtracting the estimated position error from the position information.

9. The method as defined in claim 8, wherein the regression equation is expressed by the following expression:

$$\omega_{ripple}(i) = \omega \cos \theta_i \cdot \psi_1^0 - \omega \sin \theta_i \cdot \psi_2^0 + 2\omega \cos 2\theta_i \cdot \psi_3^0 - 2\omega \sin 2\theta_i \cdot \psi_4^0,$$

where $\omega_{ripple}(i)$ represents a speed ripple for i-th position information $\theta_i$, $\omega$ represents the ideal speed, and $\psi_1^0$, $\psi_2^0$, $\psi_3^0$, and $\psi_4^0$ represent the known parameters.

10. The method as defined in claim 8, wherein the position error model equation is expressed by the following expression:

$$\theta_{Ep}(i) = \sin \theta_i \cdot \psi_{1p}^0 + \cos \theta_i \cdot \psi_{2p}^0 + \sin 2\theta_i \cdot \psi_{3p}^0 + \cos 2\theta_i \cdot \psi_{4p}^0,$$

where $\theta_{Ep}(i)$ represents an estimated position error for i-th position information.

* * * * *